Patented Feb. 22, 1949

2,462,157

UNITED STATES PATENT OFFICE 2,462,157

METHOD OF ELIMINATING POROSITY IN CRYSTALLINE SELENIUM FILMS

Wayne E. Blackburn, Wilkinsburg, Pa., assignor to Westinghouse Electric Corporation, East Pittsburgh, Pa., a corporation of Pennsylvania No Drawing. Application November 10, 1943, Serial No. 509,816

6 Claims. (Cl. 117—62)

My invention relates to processes for making selenium films and, in particular, relates to processes for eliminating porosity in crystalline selenium films for selenium rectifiers.

In accordance with the prior art, films of selenium of substantially uniform thickness have been formed on metal plates in the process of manufacturing selenium dry-contact rectifiers and light-sensitive devices, and the selenium film thus made has thereafter been annealed by heating it for several hours at temperatures in the neighborhood of 170° C., thereby converting the amorphous selenium comprising the film into a crystalline form which has a higher electrical conductivity. It has been found, however, that during this heating process, the selenium shrinks, and acquires a spongy structure which is undesirable in that it produces a discontinuous and non-uniform layer. Frequently, selenium units containing such spongy films become short-circuited when put into service in electric circuits.

One object of my invention is, accordingly, to provide a method of producing a layer of crystalline selenium on a base plate which shall be substantially continuous, and free from holes or pores of substantial size.

Another object of my invention is to provide a process for so annealing amorphous selenium films deposited on metallic plates as to produce a layer of crystalline selenium which is of continuous structure and substantially free from pores and holes of substantial size.

Still another object of my invention is to provide a process for making selenium rectifiers which are more reliable, and free from electrical defects than have been selenium rectifiers made in accordance with the teachings of the prior art.

Other objects of my invention will become apparent upon reading the following description.

In manufacturing selenium units in accordance with my invention, I first take a metallic plate, which may, for example, be of iron, and have a sandblasted surface subsequently plated with nickel. I provide a bath of molten selenium and dip the metallic plate just described therein. I then rotate these plates while the selenium is still molten at a sufficient speed, so that centrifugal force removes all of the selenium except a very uniform layer which is preferably thin. I then submerge the plate in a solution of sodium hydroxide in glycerine, the composition which I prefer being 3.6 grams of sodium hydroxide and 100 cc. of glycerine. This solution I maintain at a temperature between 170° C. and 185° C., and I leave the disk in the solution for a period of the order of three minutes. I then remove the plate from the solution, and wash it off in hot water.

During this period, the selenium partially anneals and at the same time redeposits, giving a surface of continuous crystalline structures which is free from sponginess. I then place the unit in an oven at a temperature of preferably 170° C., and leave it there for a period of from five to fifteen hours, this annealing period not being particularly critical in many cases.

After the annealing period, I Schoop spray the selenium surface with an alloy of tin and cadmium comprising 75% tin and 25% cadmium.

While I have described a specific example of the use of my invention, its broad principles are of wider application in ways which will be apparent to those skilled in the art.

I claim as my invention:

1. The method of producing selenium units which comprises forming a coating consisting of selenium on a backing plate, immersing the coated plate in a solution of sodium hydroxide in glycerine, removing the solution from the plate, thereafter annealing the plate and providing the surface of the selenium with a conducting layer.

2. The method of producing selenium units which comprises forming a coating consisting of selenium on a backing plate, immersing the coated plate in a solution of about 3.6 grams of sodium hydroxide per 100 cc. of glycerine, removing the solution from the plate, thereafter annealing the plate and providing the surface of the selenium with a conducting layer.

3. The method of producing selenium units which comprises forming a coating consisting of selenium on a backing plate, immersing the coated plate in a solution of sodium hydroxide in glycerine maintained at a temperature between 170° C. and 185° C., removing the solution from the plate, thereafter annealing the plate and providing the surface of the selenium with a conducting layer.

4. The method of producing selenium units which comprises forming a coating consisting of selenium on a backing plate, immersing the coated plate for a period of about three minutes in a solution of sodium hydroxide in glycerine maintained at a temperature between 170° C. and 185° C., removing the solution from the plate, thereafter annealing the plate and providing the surface of the selenium with a conducting layer.

5. The method of producing selenium units which comprises forming a coating consisting of selenium on a backing conductor, immersing the coated conductor for a period of about three minutes in a solution of about 3.6 grams of sodium hydroxide per 100 cubic centimeters of glycerine maintained at a temperature between 170° C. and 185° C., removing the solution from the conductor, thereafter annealing the conductor and providing the surface of the selenium with a conducting layer.

6. The method of producing selenium units which comprises forming a coating consisting of selenium on a metal plate, immersing the coated plate for a period of about three minutes in a solution of about 3.6 grams of sodium hydroxide per 100 cubic centimeters of glycerine maintained at a temperature between 170° C. and 185° C., removing the solution from the plate, thereafter annealing the plate for a period of about five to fifteen hours and providing the surface of the selenium with a conducting layer.

WAYNE E. BLACKBURN.

REFERENCES CITED

The following references are of record in the file of this patent:

UNITED STATES PATENTS

| Number | Name | Date |
| --- | --- | --- |
| 2,162,613 | Emmens | June 13, 1939 |